June 30, 1964

A. SILVERSTEIN 3,139,032

RELEASABLE COUPLING MEANS

Filed Aug. 28, 1962

INVENTOR
ABRAHAM SILVERSTEIN

BY *OE Hodges*

ATTORNEY

United States Patent Office 3,139,032
Patented June 30, 1964

3,139,032
RELEASABLE COUPLING MEANS
Abraham Silverstein, Hyattsville, Md., assignor to the United States of America as represented by the Secretary of the Navy
Filed Aug. 28, 1962, Ser. No. 220,098
14 Claims. (Cl. 102—49)
(Granted under Title 35, U.S. Code (1952), sec. 266)

The invention described herein may be manufactured and used by or for the Government of the United States of America for governmental purposes without the payment of any royalties thereon or therefor.

The present invention relates to a new and improved releasable coupling device for connecting two bodies and more particularly, to a coupling device in which two members are maintained in a fixed relationship to each other by virtue of the compressive resistance of a material in a solid state which changes its state or condition when acted upon by an external means and loses its compressive resistance thereby allowing the separation of the two members.

In the field of releasable coupling devices, it has been a general practice to employ release devices which change their state or condition upon exposure to an external material or substance to thereby effect a release, or as more currently is the case, trigger a further mechanical device which effects the release. Although such devices have served the purpose, they have not proved entirely satisfactory under all conditions of service for the reason that considerable difficulty has been experienced in obtaining a substance which is capable of withstanding great strain without breaking. Prior art devices generally have not been able to withstand hard strains and to overcome this disadvantage they generally have utilized the release mechanism as a triggering device for a second release mechanism.

One purpose of the present invention is to provide a new and improved releasable coupling device which has the advantages of the prior art devices and which eliminates the disadvantages while utilizing a less number of components essential in the prior art devices by utilization of a device which maintains a compressive resistance force upon the material which effects the release or separation of the two bodies joined together by the coupling means. The separation is effected by changing the state or condition of the substance which maintains the bodies joined together so that this substance loses its compressive resistance thereby allowing separation of the two bodies.

An object of the present invention is to provide an apparatus which is simple in construction possessing a high tensile strength by maintaining the substance, which causes the release, in compressive tension until a predetermined external event occurs which further causes the substance to lose its compressive resistance thereby allowing separation of the bodies joined together.

Another object is to provide a releasable coupling device which is dependent only upon the change of state or condition of the release actuating material to effect a complete separation of the bodies joined together.

A further object of the invention is to eliminate all mechanical moving parts and dependency upon water circulation to effect a separation of the bodies joined together.

Other objects and features of the invention will become apparent to those skilled in the art as disclosure is made in the following detailed description with an illustrative example of the invention illustrated in the accompanying sheet of drawing in which.

Figure 1:
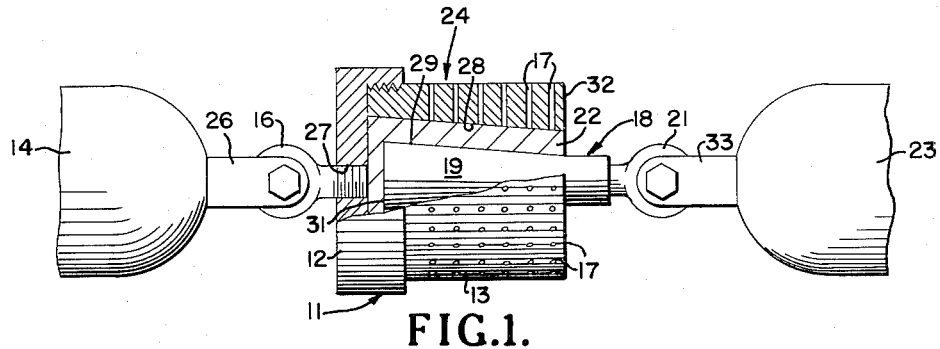
FIG. 1 is a side view, partially in section of one of the embodiments of the invention which is utilized as a releasable coupling device in deep sea work.

Referring now to the drawing, wherein like reference characters designate like or corresponding parts throughout the several views, there is illustrated in FIG. 1 a releasable coupling, generally shown at 24, connected between one body 14 and another body 23. The body 14 could illustratively be a mine or an instrumented diving assembly while the other body 23 could illustratively be a suitable anchor therefor. The body 14 is suitably connected to the releasable coupling 24 by means of a U-bolt 26 which passes through the eye of a threaded eyebolt 16 which is secured to the faceplate or cap 12 of the releasable coupling 24 by means of tapped hole 27 which is located in the center of the faceplate or cap 12. The threaded cylinder wall 13 engages the internally threaded cap 12 to connect the two members together. The cylinder wall 13 is attached to the faceplate 12 on one end and the other end remains open with the exterior side walls being parallel while the interior side walls 28 are convergingly tapered toward the open end. The plurality of holes 17 are drilled through the cylinder wall 13 normal to its exterior surface to allow a suitable duct passage from the exterior surface to the interior surface. The side walls 13 connected to the faceplate 12 form a cavity as viewed from the open end into which a divergingly tapered rod 19 can freely pass through the open end. Connected to one end of the rod 19 is a threaded eyebolt 21 by which a suitable U-bolt 33 connects the body 23 to the releasable coupling 24. The rod 19, from the one end to which the other body 23 is connected, has divergingly tapered side walls 29 which extend to the free end 31 of the rod. The cross-sectional area or cross-sectional distance of the free end 31 of rod 19 is less than the cross-sectional area as measured between the side walls 28 at the open end 32 of the cylinder walls 13 so that the rod may freely pass into and out of the cavity formed by the side walls 13 and faceplate 12. The volume or space that exists between the inside convergingly tapered sidewall 28 of the cylinder 13 and the outside divergingly tapered sidewall of the rod 19 is filled with a material which under normal atmospheric conditions is solid and which after submergence for a predetermined time in water changes to a flowable or liquid state. A few acceptable materials utilized are gelatin, methylcellulose, agar vegetable jellies, starch, sugar, and polyvinyl alcohol.

The gelatin is applied to the rod 19 by chilling the rod and subsequently dipping the rod into a gelatin solution and removing it and allowing the gelatin to solidify. This process is repeated until the desired thickness of gelatin is obtained on the rod 19. The rod 19 with the gelatin upon it is then machined to conform to the shape of the cavity formed by the cylinder walls 13 and the cap 12. The releasable coupling means then can be assembled by removing the cap 12 and inserting the rod 19 with the gelatin 22 upon it and then replacing the cap 12. Since the gelatin has no adhesive properties to adhere to the metal rod 19 it is sometimes desirable to knurl the rod 19 in order to obtain better adhesion between the gelatin and rod and thus permit easier machining of the rod with the gelatin 22 thereupon. The gelatin is applied in successive layers since gelatin dries from the outside to the inside and upon drying shrinks. Thus by applying the gelatin in successive layers a more uniform coating of solid gelatin on rod 19 is obtained. Dry gelatin is comparable in hardness to Lucite and apparently tougher in that it does not get tacky in wet weather and it will char rather than melt under heat. The releasable coupling 24 assembled with the gelatin placed between the rod 19 and cylinder walls 13 is capable of withstanding tons of tension since the tapered rod can clear the cylinder only by removing the hard gelatin which occurs by softening and squirting out when submerged in water for a period of time. The reason for the great strength of the gelatin is the fact that the gelatin is under a very high compressive force and a relatively low shear force. In actual tests with the taper of the convergingly tapered sidewalls and divergingly tapered sidewalls 28 and 29 respectively, the metal cylinder wall 13 has actually failed on test before failure of the gelatin.

The release, with the one body 14 attached on one end, the other body 23 attached to the other end, is submerged in water, either salt water or fresh water, as the case may be, the gelatin in contact with the water absorbs a portion of water and swells and becomes softened where the gelatin is in contact with water. As the gelatin swells at the edges it acts as a wick bringing in more water to that portion of the gelatin which is yet hard and unswelled. This process results in a progressive recession of the hard gelatin boundary until the entire gelatin layer has been softened. The gelatin then begins to squeeze out as the metal sections slowly slide apart. Utilizing the configuration of FIG. 1, with all of the holes 17 closed, and the water touching only the open end 32 of the releasable coupling means 24 the softening of the gelatin progresses at a rate of about one inch per month. For this reason the holes 17 are drilled normal to the surface of the cylinder wall 13 and extend through the cylinder walls to the inside convergingly tapered walls 28 so that water is brought into contact with more area of the gelatin thereby increasing the rate of softening of the gelatin. The predetermined time of release of the releasable coupling sections can be controlled by the number and size of the holes 17 drilled through the cylinder wall 13 as hereinbefore described. It has been determined by tests that neither silt nor the concentration of salt in a salt water solution materially affects the rate of softening of he gelatin in this manner. Even though the gelatin be covered with silt, the silt still acts as a wick to bring the water in contact with the hard gelatin. The high pressure present in the deep sea does not materially affect the rate of softening of the gelatin since the absorption of water and gelatin results in a volume somewhat less than the sum of the two volumes before their combination and, thus, the rate of softening in high pressure is merely slightly more rapid than under normal sea water pressure at the surface. If the summation of the water and gelatin upon absorption could result in a greater volume than the original two volumes or even of equal volume, the result would be a slight retardation in the absorption rate. Methylcellulose is one material which when combined with water results in a greater volume and thus is somewhat retarded in the absorption rate under great pressure. Sugar, which is a substitute for gelatin, results in a more rapid release of the release mechanism since the rate of dissolution is greater than that of gelatin.

In operation the body 14, which is floatable such as an instrument diving assembly or a mine, is attached to one member 11 of the releasable coupling means 24 which comprises the threaded eyebolt 16, the faceplate or cap 12 and the cylinder wall 13. Attached to the other end of the releasable coupling 24 is the other body 23 which is connected to the other member shown generally as 18 which comprises the threaded eyebolt 21 and the rod 19. Between the member 11 and the other member 18 is a releasable substance or material 22 such as gelatin or any of the other described materials which fills the space in the cavity between the two members 11 and 18. Upon submergence the water starts to react or combine with the water-soluble substance 22 such as gelatin and after a predetermined time, depending upon the total surface area of the material 22 which is in contact with the water through the open end 32 and through the holes 17 in the sidewall 13, the material 22 softens and is squeezed out so that the two members 11 and 18 are separated thereby allowing the body 14 to float to the surface while the other body 23 remains at the bottom of the ocean.

Figure 2:
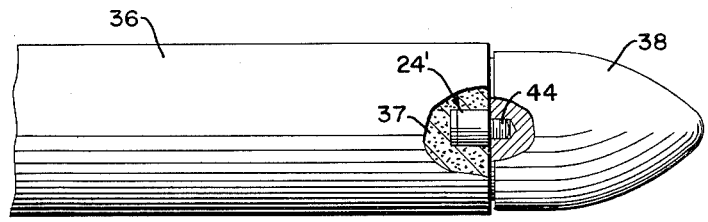
FIG. 2 is a plan view, partially in section, of another embodiment of the invention as utilized in missile or rocket apparatus.

FIG. 2 is an illustration of the releasable coupling means generally shown as 24' as utilized in a rocket or missile. The rocket has a rocket motor 36 which is filled with a solid fuel propellant 37 so that the burning of the propellant produces a thrust out the rearward end of the rocket propelling it forward and, as the solid fuel propellant is completely burned up it reaches the front end of the rocket motor 36. Here it ignites an explosive which is housed in the releasable coupling as will be described in connection with FIG. 3, with the resulting explosion forcibly releasing the payload 38 which is attached to the front end of the rocket motor 36 thereby separating the payload 38 from the rocket motor 36. The releasable coupling 24' is employed to join and maintain the rocket motor 36 and the payload 38 joined together in a fixed relationship to each other for the entire journey until the solid propellant 37 is completely exhausted. Upon this occurrence the explosion within the releasable coupling means 24' separates the payload 38 from the rocket motor 36.

Figure 3:
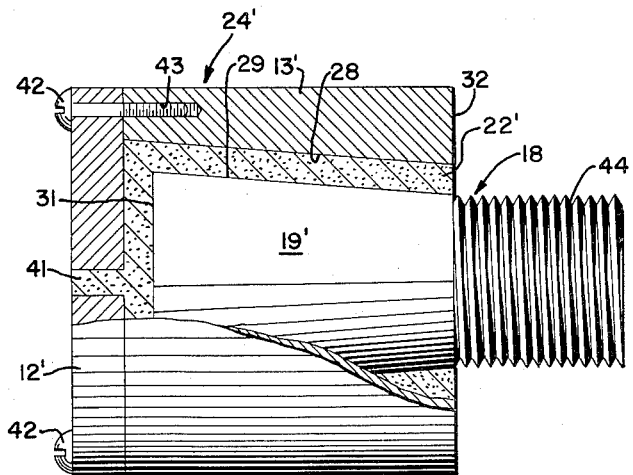
FIG. 3 is an exploded side view, partially in section of the releasable coupling means shown in FIG. 2.

FIG. 3 illustrates the releasable coupling means shown generally as 24' which is utilized in the rocket as described in relation to FIG. 2. The faceplate 12' is a flat plate with a touch hole 41 placed in the center of the faceplate and is joined to the cylinder wall 13' by suitable screws 42 which enter tapped holes 43 in the sidewalls 13' thereby securing the base plate 12' to the cylinder walls 13'. The faceplate 12' and the cylinder walls 13' form a cavity as described hereinbefore in relation to FIG. 1, into which another member, shown generally at 18, having divergingly tapered walls 29 is inserted. The space between the tapered rod 19' and the cavity is filled with a suitable explosive such as nitrocellulose 22'. The one end of the tapered rod 19' ends in a threaded screw 44 which is used to join the payload 38, FIG. 2, to the rocket motor 36 by means of a suitable tapped hole in the payload.

In operation as the propellant 37, FIG. 2, is nearly exhausted a fire will be transmitted through the touch hole 41, FIG. 3, thereby exploding the explosive material 22' causing the propulsion of the rod 19' with the payload 38 attached thereto, FIG. 2, to be separated from the one member generally shown as 11'. The explosion causes cylinder 19' to act generally as though it were a piston within the cavity as defined by sidewall 13' and faceplate 12, since the touch hole 41 and the clearance between the cylinder walls 13' and the rod 19' at the open end 32 is sufficiently small to prevent the dissipation of the explosive gases created by the combustion of the explosive material 22'.

The releasable coupling means of the present application is simple, in that two parts are involved, and effective, in that there are no moving or actuating mechanical parts to be triggered, means of separating two bodies which have been coupled together after the occurrence of a predetermined outside event. The releasable coupling means 24, in that the releasable material is generally in a high compressive tension, provides a strong, reliable and fail proof means for separating two bodies.

Various modifications are contemplated and may obviously be resorted to by those skilled in the art without departing from the spirit and scope of the invention, as hereinafter defined by the appended claims, as only preferred embodiments thereof have been disclosed.

What is claimed is:

1. A releasable coupling for connecting two bodies which comprises one member connected on its face to one body toward said one body, another member connected on its face to another body toward said other body, said one member having a cavity therein opening toward the other member into which cavity the other member extends, the one member having sidewalls defining said cavity convergingly tapered toward its open end, said other member in the portion within said cavity being divergingly tapered toward its free end, the larger end of said other member within said cavity having a cross-sectional area smaller than the opening of said cavity and passable through said open end of said cavity, a material filling said cavity between said members having one state in which the material is in a relatively solid condition possessing large compressive resistance for holding said one member in a fixed position relative to said other member, and an external conditioning means for changing said material from said one state to another state in which said material loses its compressive resistance sufficient to release said one member from said other member.

2. A releasable coupling for connecting two bodies as recited in claim 1 in which said material comprises an explosive substance.

3. A releasable coupling for connecting two bodies as recited in claim 2 wherein said explosive substance comprises nitrocellulose.

4. A releasable coupling as recited in claim 1 wherein said material is a water soluble substance.

5. A releasable coupling as recited in claim 4 wherein said water soluble substance comprises gelatin.

6. A releasable coupling as recited in claim 4 wherein said water soluble substance comprises one of the group consisting of gelatin, methylcellulose, starch, sugar, or polyvinyl alcohol.

7. A coupling for connecting two bodies and comprising one member having a faceplate connected to one body, cylindrical sidewalls attached to said faceplate on one end and being convergingly tapered toward the other end which is open to form a cavity, another member connected to another body on one end and being divergingly tapered toward the other end and inserted in the cavity of said one member with the maximum cross-sectional distance of the other end thereof being less than the minimum cross-sectional distance of said other end of said one member, a material filling the space between said one member and said other member transformable from a first state characterized by the physical property of having high compressive resistance to a second state characterized by the physical property of having relatively low compressive resistance by the co-action of the material with an activating agent in contact therewith whereby the two members are released by the emergence of said other member from within the cavity of the one member.

8. A releasable coupling for connecting two bodies comprising one member having an open end, a faceplate and cylindrical sidewall attached to the faceplate thereby forming a closed end, the inside surface of said sidewall being convergingly tapered toward the open end and forming a cavity, one body attached to the faceplate of said one member, a rod having a divergingly tapered sidewall passable through the open end of said one member into the cavity and forming a space between said one member and said rod, another body attached to said rod on an end extending beyond the cavity, a water soluble substance filling the space between said one member and said rod holding said one member and said rod in a fixed position relative to each other by the compressive resistance of the water soluble substance while in a solid state whereby upon submergence of the coupling means in a body of water for a predetermined time said water soluble substance changes to a flowable state losing its compressive resistance sufficient to release said bodies by the separation of said rod from said one member.

9. A releasable coupling as recited in claim 8 wherein the cylindrical sidewall of said one member has at least one hole normal to the surface of said sidewall whereby the predetermined time of release of said bodies is varied in direct portion to the number and area of the holes.

10. A releasable coupling as recited in claim 9 wherein the water soluble substance comprises gelatin.

11. A releasable coupling as recited in claim 9 wherein the water soluble substance comprises one of the group consisting of gelatin, methylcellulose, starch, sugar, or polyvinyl alcohol.

12. A releasable coupling for connecting two bodies comprising one body connected to one member, said one member having a faceplate with a touch hole extending therethrough normal to its surface, a cylindrical sidewall having two ends, one end being attached to the faceplate and the other end being open to form a cavity, said sidewall being convergingly tapered toward its open end, a divergingly tapered rod and connected to another body, extending into the cavity the longest cross-sectional distance of said tapered rod passing through the open end of said one member, an explosive material being in the solid state and having high compressive resistance filling the touch hole and the space between said member and said tapered rod, the second body having means to ignite the explosive material at the touch hole whereby upon ignition of said explosive material the two bodies are forcibly separated from each other by the explosive material changing from the solid state to the gaseous state thereby propelling said rod from the open end of said one member.

13. A releasable coupling as recited in claim 12 wherein said one body is a rocket booster, said other body is a payload.

14. A releasable coupling as recited in claim 12 wherein said explosive material comprises nitrocellulose.

References Cited in the file of this patent

UNITED STATES PATENTS

| | | |
|---|---|---|
| 2,035,497 | Morse | Mar. 31, 1936 |
| 2,368,310 | Lecky et al. | Jan. 30, 1945 |
| 2,418,549 | Rugeris | Apr. 8, 1945 |
| 2,539,548 | Norris et al. | Jan. 30, 1951 |
| 2,818,807 | Tracey | Jan. 7, 1958 |
| 2,945,442 | Adelman et al. | July 19, 1960 |